United States Patent
Driscoll et al.

(10) Patent No.: US 9,146,437 B2
(45) Date of Patent: Sep. 29, 2015

(54) ELECTRO-OPTIC WINDOW ASSEMBLY

(71) Applicant: Gentex Corporation, Zeeland, MI (US)

(72) Inventors: David I. Driscoll, Caledonia, MI (US); Bradley L. Busscher, Grand Rapids, MI (US); Kevin L. Ash, Grand Rapids, MI (US)

(73) Assignee: GENTEX CORPORATION, Zeeland, MI (US)

(*) Notice: Subject to any disclaimer, the term of this patent is extended or adjusted under 35 U.S.C. 154(b) by 0 days.

(21) Appl. No.: 14/169,641

(22) Filed: Jan. 31, 2014

(65) Prior Publication Data

US 2014/0268288 A1    Sep. 18, 2014

Related U.S. Application Data

(60) Provisional application No. 61/759,009, filed on Jan. 31, 2013.

(51) Int. Cl.
*G02F 1/153* (2006.01)
*E06B 9/24* (2006.01)

(52) U.S. Cl.
CPC ............ *G02F 1/1533* (2013.01); *E06B 9/24* (2013.01)

(58) Field of Classification Search
CPC ................................. G02F 1/1533; E06B 9/24
See application file for complete search history.

(56) References Cited

U.S. PATENT DOCUMENTS

| | | | |
|---|---|---|---|
| 4,377,611 A | 3/1983 | Fischer et al. | |
| 5,042,923 A | 8/1991 | Wolf et al. | |
| 5,122,403 A | 6/1992 | Roginski et al. | |
| 5,712,724 A | 1/1998 | Klocek et al. | |
| 5,780,160 A | 7/1998 | Allemand et al. | |
| 6,094,292 A | 7/2000 | Goldner et al. | |
| 6,157,480 A | 12/2000 | Anderson et al. | |

(Continued)

FOREIGN PATENT DOCUMENTS

| | | | |
|---|---|---|---|
| JP | H08262913 | 10/1996 | |
| WO | WO2007146862 | 12/2007 | |
| WO | WO 2014/121073 A1 * | 7/2014 | ............... G02F 1/15 |

OTHER PUBLICATIONS

Research Frontiers, Research Frontiers Demonstrates SPD-Smart Windows Establishing New Benchmarks of Performance and Invites the Smart Glass Industry to Participate in Side-by-Side Public Evaluations and Comparisons, Jun. 14, 2010, Woodbury, NY, 4 pages.

(Continued)

*Primary Examiner* — David N Spector
(74) *Attorney, Agent, or Firm* — Price Heneveld LLP; Scott P. Ryan (57) ABSTRACT

An electro-optic window assembly is provided that includes a first substantially transparent substrate comprising: a first surface, a second surface, and a first peripheral edge; and a second substantially transparent substrate comprising: a third surface, a fourth surface, and a second peripheral edge. The first and second substrates define a cavity. The assembly further includes an electro-optic medium at least partially filling the cavity and configured to reduce the transmission of light viewed through the electro-optic window assembly. Further, the electro-optic window assembly is configured such that the substrates each have a theoretical maximum thermal stress of less than approximately 25 MPa upon exposure of the window assembly to an application environment.

20 Claims, 4 Drawing Sheets

(56) References Cited

U.S. PATENT DOCUMENTS

| | | | |
|---|---|---|---|
| 6,373,618 | B1 | 4/2002 | Agrawal et al. |
| 6,493,128 | B1 | 12/2002 | Agrawal et al. |
| 6,783,099 | B2 | 8/2004 | Rukavina et al. |
| 7,130,101 | B2 | 10/2006 | Rukavina et al. |
| 7,154,657 | B2 | 12/2006 | Poll et al. |
| 7,173,750 | B2 | 2/2007 | Rukavina |
| 7,196,836 | B2 | 3/2007 | Bauer et al. |
| 7,414,770 | B2 | 8/2008 | Ash et al. |
| 7,502,156 | B2 | 3/2009 | Tonar et al. |
| 7,535,614 | B1 | 5/2009 | Tapley et al. |
| 7,826,123 | B2 | 11/2010 | McCabe et al. |
| 8,368,992 | B2 | 2/2013 | Neuman et al. |
| 8,482,838 | B2 | 7/2013 | Sbar et al. |
| 8,526,094 | B2 | 9/2013 | Letocart |
| 2003/0142057 | A1 | 7/2003 | Niyama et al. |
| 2008/0085958 | A1 | 4/2008 | Gros et al. |
| 2008/0302657 | A1 | 12/2008 | Luten et al. |
| 2009/0297806 | A1 | 12/2009 | Dawson-Elli et al. |
| 2011/0255142 | A1 | 10/2011 | Ash et al. |
| 2011/0304899 | A1 | 12/2011 | Kwak et al. |
| 2013/0120822 | A1 | 5/2013 | Veenman et al. |
| 2013/0161971 | A1 | 6/2013 | Bugno et al. |
| 2013/0182308 | A1 | 7/2013 | Guarr et al. |

OTHER PUBLICATIONS

3M, Vikuiti Polarizers from 3M Manage Light for Aircraft Windows in Private Business and Commercial Planes, Oct. 7, 2003, Orlando, FL, 2 pages.

European Commission, European Research Headlines, Thin-film "smart glass" puts rivals in the shade, Apr. 30, 2013, 2 pages.

GENTEX Corporation, Aircraft Windows, printed from website Sep. 11, 2013, 2 pages.

Dr. Haewon, UHM, Ms. Linda Bruce, Dr. Thomas Culp and Dr. Chris Roger, ATOFINA Chemicals, Inc., Glass Strengthening by Edge Coatings, Glass Processing Days, Jun. 18-21, 2001, pp. 780-784.

Yoshinori Akamatsu, Mizuki Nishi and Kentaro Tsutsumi, Glass Research Center, Central Glass Co., Ltd., New Method to Strengthen Glass Edges by Co2 Laser Irradiation, Glass Processing Days 2005, Japan, pp. 1-3.

Dr. Alexander Zhimalov, Dr. Vladimir Solinov, Dr. Vladimir Kondratenko, Mrs. Tatjana Kaplina, Influence of glass edge processing on its strength and thermal stability, Glass Performance Days 2007, Russia, pp. 738-739.

Suresh Gulati and Timothy Roe, Corning Incorporated and Jorma Vitkala Tamglass Ltd. Oy, Importance of Edge Finish on Thermal Tempering, Glass Processing Days, Jun. 18-21, 2001, pp. 72-78.

Vincenzo M. Sglavo, Christine Muller & Francesca Righetti, DIMTI—University of Trento, Influence of edge finishing on the resistance to thermal stresses of float glass, Glass Performance Days 2007, Italy, pp. 668-672.

Michel Dubru, Jean-Clement Nugue, Guy Van Marcke De Lummen, Toughened Glass: Mechanical Properties and En 12600 Behaviour, Glass Processing Days 2005, pp. 1-5.

Dr. O.S. Narayanaswamy, Computer Simulations, Evolution of Glass Tempering Models, Jun. 2001, pp. 83-86.

Dr. Ignatius Calderone, Dr. Leon Jacob, The Fallacy of the Weibull Distribution for Window Glass Design, Glass Processing Days, Jun. 18-21, 2001, pp. 293-297.

Yuri Rodichev, Vladimir Maslov, Alexandr Netychuk, Vladimir Bodunov, Yury Yevplov, Bending strength and fracture of glass materials under the different loading conditions, Glass Performance Days 2007, pp. 615-618.

A. William Lingnell, P.E., W. Lynn Beason, Ph.D., P.E., A Method of Evaluation for Thermal Stress in Monolithic Annealed Glass, Glass Processing Days 2003, pp. 291-293.

Patent Cooperation Treaty, International Searching Authority, International Search Report, Written Opinion of the International Searching Authority and Notification of Transmittal, May 22, 2014, 8 Pages.

* cited by examiner

ELECTRO-OPTIC WINDOW ASSEMBLY

CROSS-REFERENCED TO RELATED APPLICATION

The present application claims priority to and the benefit under 35 U.S.C. §119(e) of U.S. Provisional Patent Application No. 61/759,009 filed on Jan. 31, 2013, entitled "ELECTRO-OPTIC WINDOW ASSEMBLY," the entire disclosure of which is hereby incorporated herein by reference.

FIELD OF THE INVENTION

The present invention generally relates to an electro-optic window assembly, and more particularly, an electrochromic window assembly for use in various window applications including but not limited to aircraft, vehicle and building window applications.

SUMMARY OF THE INVENTION

According to one aspect of the disclosure, an electro-optic window assembly includes a first substantially transparent substrate having a first surface and a second surface, a second substantially transparent substrate having a third surface and a fourth surface, wherein the first and second substantially transparent substrates define a cavity, and an electro-optic medium at least partially filling the cavity, wherein the electro-optic medium is configured to reduce the transmission of light viewed through the electro-optic window assembly, wherein the electro-optic window assembly is configured to have a theoretical maximum thermal stress of less than approximately 25 MPa.

According to an aspect of the disclosure, an electro-optic window assembly includes a first substantially transparent substrate comprising: a first surface, a second surface, and a first peripheral edge; and a second substantially transparent substrate comprising: a third surface, a fourth surface, and a second peripheral edge. The first and second substrates define a cavity. The assembly further includes an electro-optic medium at least partially filling the cavity and configured to reduce the transmission of light viewed through the electro-optic window assembly. Further, the electro-optic window assembly is configured such that the substrates each have a theoretical maximum thermal stress of less than approximately 25 MPa upon exposure of the window assembly to an application environment.

According to an additional aspect of the disclosure, an electro-optic window assembly includes a bezel having an inner edge, the bezel covering a peripheral portion of a first substantially transparent substrate and a peripheral portion of a second substantially transparent substrate; a first substantially transparent substrate comprising: a first surface with a portion in thermal communication with the bezel, a second surface, and a first peripheral edge; and a second substantially transparent substrate comprising: a third surface, a fourth surface with a portion in thermal communication with the bezel, and a second peripheral edge. The first and second substrates define a cavity, and the fourth surface and the inner edge of the bezel define a visible area. The assembly further includes an electro-optic medium at least partially filling the cavity and configured to reduce the transmission of light viewed through the electro-optic window assembly. Further, the visible area and the peripheral portions are sized such that the substrates each have a theoretical maximum thermal stress of less than approximately 25 MPa upon exposure of the electro-optic window assembly to an application environment.

According to a further aspect of the disclosure, an electro-optic window assembly includes an exterior structure; a bezel in thermal communication with the exterior structure, the bezel having an inner edge, and covering a peripheral portion of a first substantially transparent substrate and a peripheral portion of a second substantially transparent substrate; a first substantially transparent substrate comprising: a first surface with a portion in thermal communication with the bezel, a second surface, and a first peripheral edge; and a second substantially transparent substrate comprising: a third surface, a fourth surface with a portion in thermal communication with the bezel, and a second peripheral edge. The first and second substrates define a cavity, and the fourth surface and the inner edge of the bezel define a visible area. The assembly further includes an electro-optic medium at least partially filling the cavity and configured to reduce the transmission of light viewed through the electro-optic window assembly. Further, the electro-optic window assembly is configured such that the substrates each have a theoretical maximum thermal stress of less than approximately 25 MPa when an approximately 50° C. thermal gradient exists between the peripheral portions of the substrates and the visible area.

These and other features, advantages, and objects of the present invention will be further understood and appreciated by those skilled in the art by reference to the following specification, claims, and appended drawings.

BRIEF DESCRIPTION OF THE DRAWINGS

The disclosure will become more fully understood from the detailed description and the accompanying drawings, wherein.

DETAILED DESCRIPTION

The present illustrated embodiments reside primarily in combinations of method steps and apparatus components related to an electro-optic window assembly. Accordingly, the apparatus components and method steps have been represented, where appropriate, by conventional symbols in the drawings, showing only those specific details that are pertinent to understanding the embodiments of the present invention so as not to obscure the disclosure with details that will be readily apparent to those of ordinary skill in the art having the benefit of the description herein. Further, like numerals in the description and drawings represent like elements.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Figure 1:
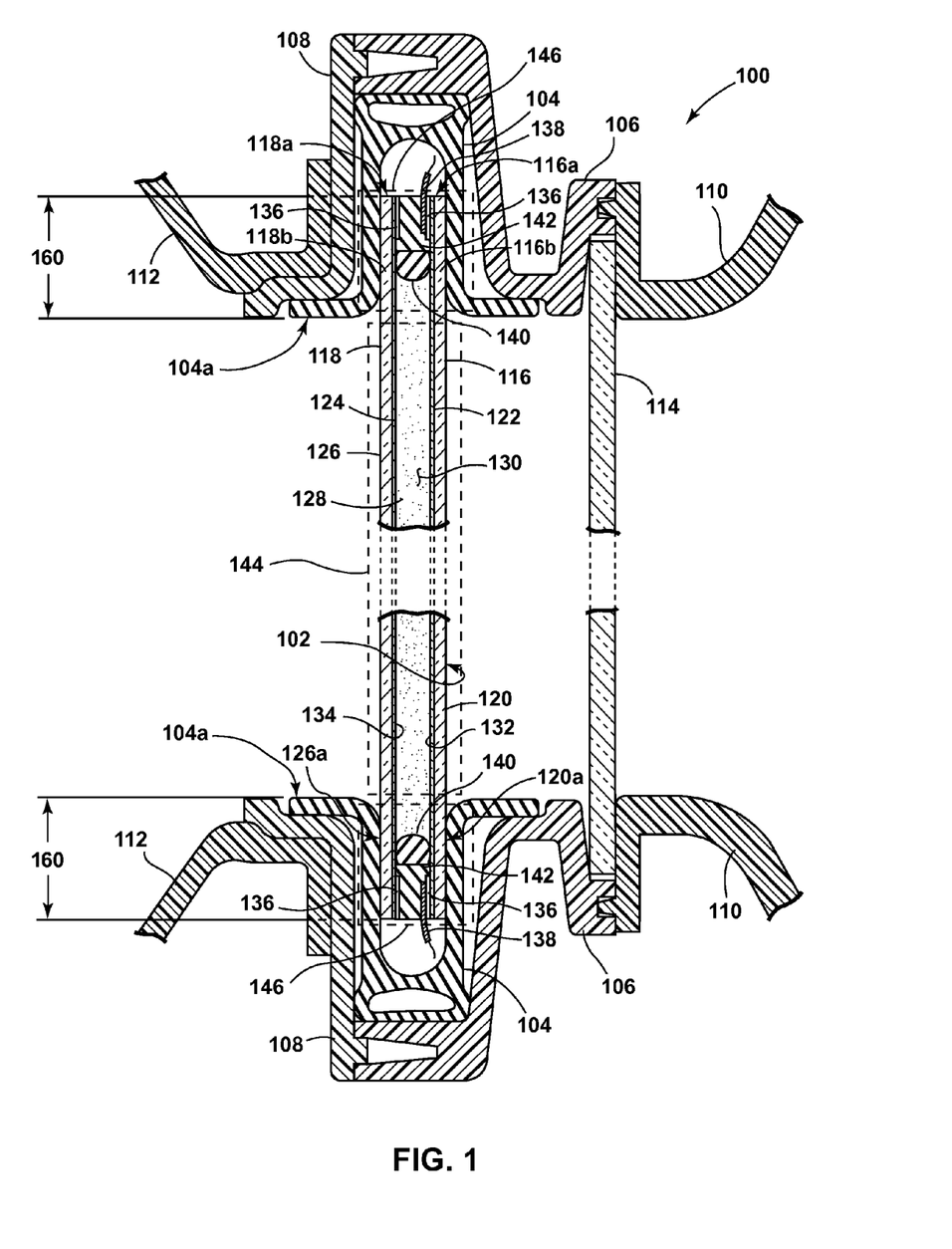
FIG. 1 is a cross-sectional view of an electro-optic window assembly, in accordance with one embodiment of the disclosure.
Figure 2:
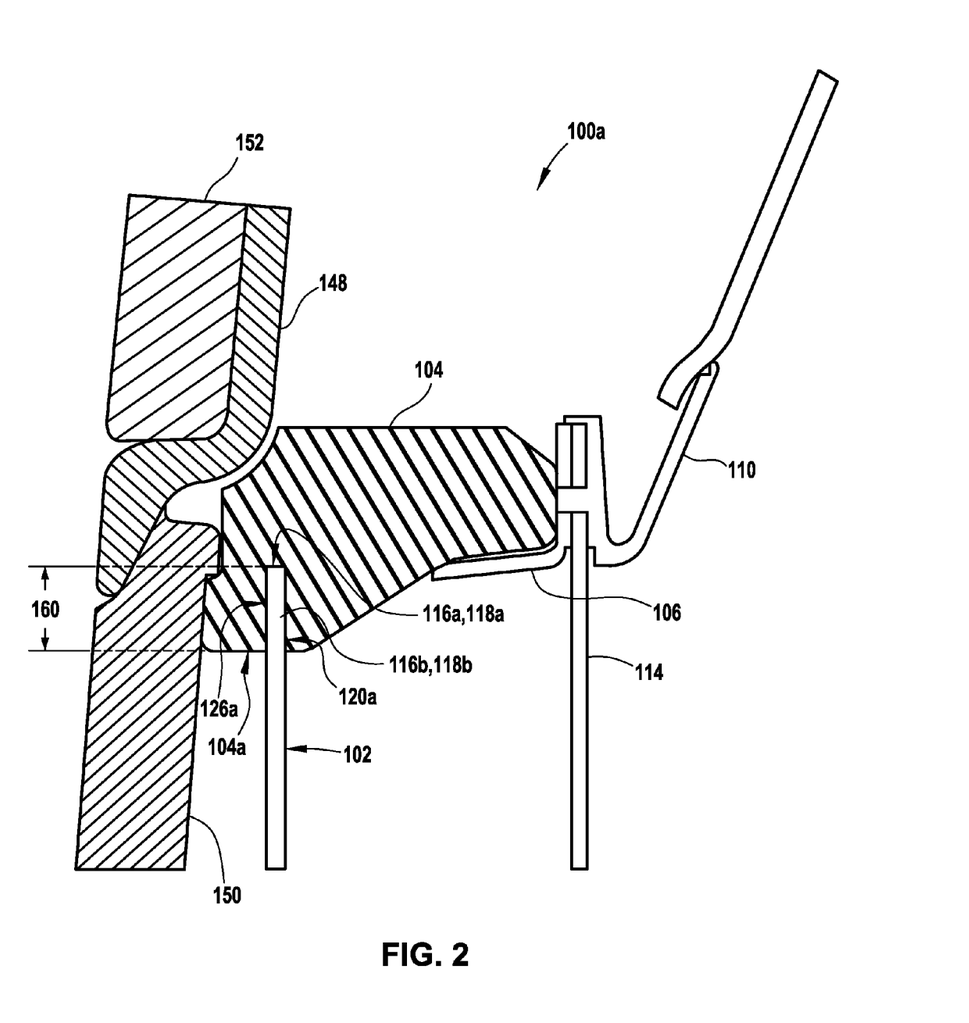
FIG. 2 is a cross-sectional view of an electro-optic window assembly, in accordance with an embodiment of the disclosure.
Figure 3:
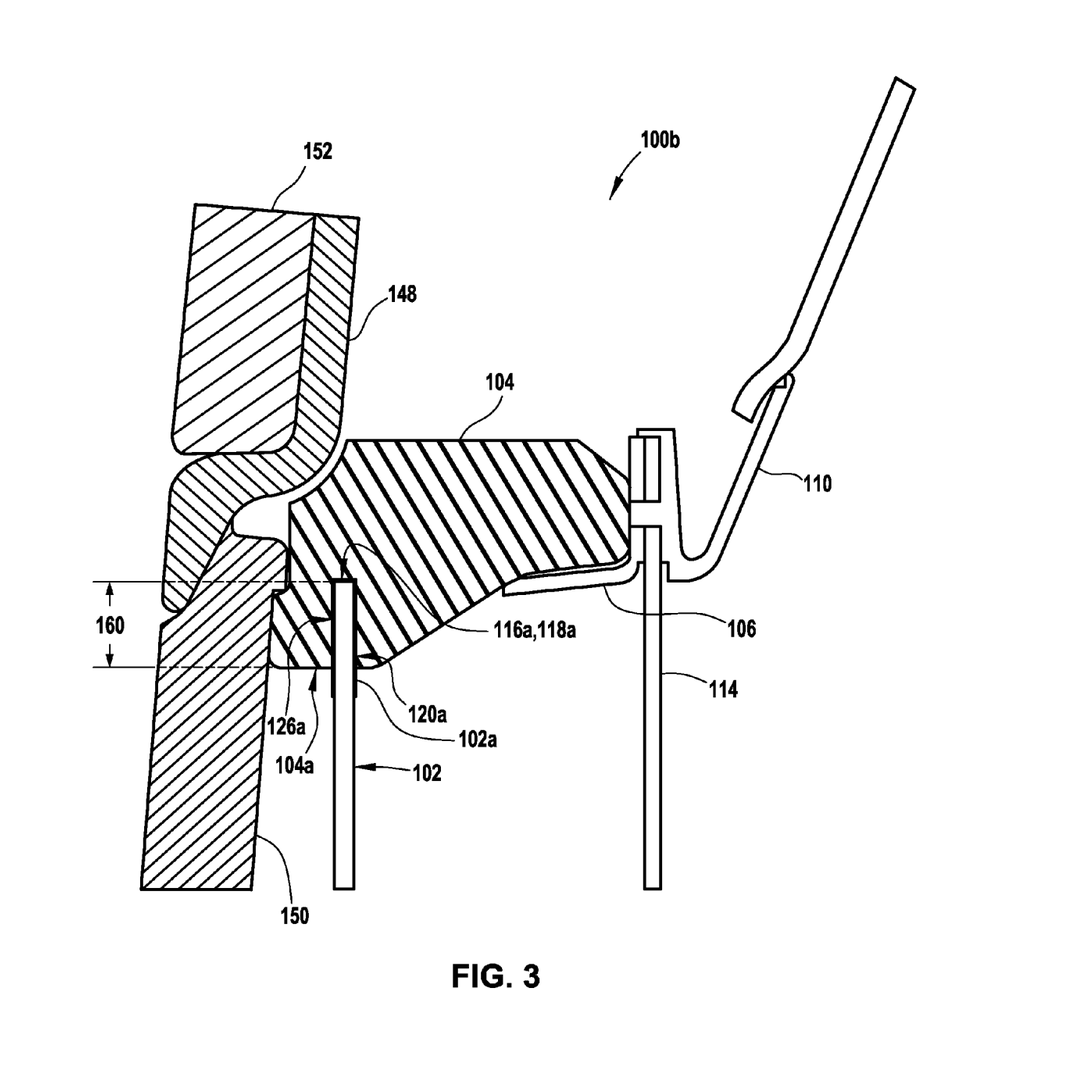
FIG. 3 is a cross-sectional view of an electro-optic window assembly, in accordance with a further embodiment of the disclosure.

In reference to FIGS. 1-3, an electro-optic assembly is generally shown at referenced identifiers 100, 100a and 100b, respectively. Referring to FIG. 1, the electro-optic assembly 100 includes an electro-optic element (e.g., an electrochromic element) that is generally indicated at 102. The electro-optic element 102 can have a perimeter that is enclosed by a bezel 104 (e.g., an elastomeric bezel). In some embodiments, bezel 104 is primarily composed of a thermally insulative material or materials. The bezel 104 and the enclosed electro-optic element 102 are secured in place by a middle reveal 106 and an outer reveal 108. In an alternate embodiment, the bezel 104 and the enclosed electro-optic element 102 can be secured in place by structures similar to middle reveal 106 and outer reveal 108, such as, for example, frames or bezels. The middle reveal 106 and the outer reveal 108 and the elements secured by them can be joined to, and secured in place by, an inner reveal 110 and a bellows 112. Bellows 112 can be composed of an elastomeric material. In some aspects, bellows 112 comprises a thermally insulative material.

The inner reveal 110 and the middle reveal 106 are also shown securing in place a dust cover 114 for protecting the electro-optic element 102. As shown, the dust cover 114 can be a transparent substrate. The bezel 104 can be composed of a material that is strong enough to retain the electro-optic element 102 in place, while at the same time insulating the electro-optic element 102 from structural stresses and forces applied to the bezel 104 by the middle reveal 106, the inner reveal 110, the outer reveal 108, and the bellows 112.

The electro-optic element 102 can include a first substantially transparent substrate 116 and a second substantially transparent substrate 118 spaced from the first substantially transparent substrate 116. The first substantially transparent substrate 116 can have a first surface 120, a second surface 122 and a peripheral edge 116a. The second substantially transparent substrate 118 can have a third surface 124, a fourth surface 126 and a peripheral edge 118a. In addition, the first and second substrates 116 and 118 can comprise peripheral portions 116b and 118b, respectively. Further, the first and second substantially transparent substrates 116, 118 can define a cavity 128 at least partially filled with an electro-optic medium 130. The electro-optic element 102 can include a first seal 140 and a second seal 142 configured to seal the electro-optic medium 130 within the cavity 128.

The second and third surfaces 122, 124 can be coated with transparent conductive layer 132 and 134, respectively, and also include a highly conductive material 136 deposited on the transparent conductive layer 132, 134 around a significant portion of the perimeter of each of first substrate 116 and second substrate 118. The highly conductive material 136 can be silver epoxy comprising silver flakes. The transparent conductive layers 132 and 134 can comprise an indium tin oxide ("ITO") layer. Each of the first substrate 116 and the second substrate 118 also includes multiple conducting structures 138 electrically coupled to the highly conductive material 136 deposited around a significant portion of the perimeter of the structures.

Still referring to FIG. 1, the bezel 104 may also be configured to cover the peripheral portions 116b, 118b of the first and second substantially transparent substrates 116 and 118, respectively. As such, the peripheral portions 116b, 118b of the substrates 116, 118 are generally encased within the bezel 104, thus defining a shade area 146 within the electro-optic window assembly 100. In some embodiments, a portion 120a of the first surface 120 of the first substrate 116 is in thermal communication with the bezel 104. Similarly, in some embodiments, a portion 126a of the fourth surface 126 is in thermal communication with the bezel 104. The bezel 104 structure may also be configured with a bezel lower edge 104a, as shown in FIG. 1. As such, the bezel lower edge 104a and the fourth surface 126 can define a visible area 144 of the electro-optic window assembly 100 and electro-optic element 102. The visible area 144 of the element 102 is not otherwise encased, covered or shrouded by bezel 104; consequently, sunlight and other radiation can reach the electro-optic element 102 through the visible area 144. In contrast, sunlight and other radiation cannot generally reach the shade area 146 of the assembly 100.

When the electro-optic window assembly 100 is configured in an airplane configuration according to one exemplary embodiment, solar heating can raise the temperature in the electro-optic element 102 visible area 144. As the visible area 144 of the window assembly 100 increases in temperature, the shade area 146 remains generally encased in surround structure, including bellows 112. The bellows 112 is typically in thermal communication with an outer, exterior portion of the structure housing the assembly 100 (e.g., an exterior, cold surface of the aircraft when the electro-optic window assembly 100 is configured for use on an airplane). As such, the shade area 146 can remain at a relatively cold temperature in comparison to the visible area 144, particularly when the visible area 144 is subjected to solar and other radiation. More specifically, the peripheral edges 116a, 118a and peripheral portions 116b, 118b of the first and second substrates 116 and 118 in the shade area 146 can be relatively colder in temperature compared to the portions of the substrates 116 and 118 in the visible area 144. Consequently, the thermal conductivity between the bezel 104 (often composed of a thermally insulative material) and the substrates 116, 118 is a significant factor in the temperature gradients observed between the visible area 144 and the shade area 146 of the electro-optic window assembly 100.

Electro-optic window assemblies can be susceptible to crack failures. Cracks can emanate perpendicularly from peripheral edges of the substrates employed in these assemblies, indicating that the edge strength of these substrates is not sufficient to withstand the hoop stresses present near the edges. This hoop stress can either be mechanically induced, thermally induced or induced through a combination of mechanical and thermal environmental exposures. In some cases, the temperature gradients associated with solar heating of the window assemblies during application conditions (e.g., an aircraft at a cruising altitude experiencing very low ambient exterior temperatures that exist with simultaneous direct sunlight exposure to the windows of the aircraft) may produce thermal stresses in the glass substrates that can cause failures and/or cracking in the substrates.

According to one embodiment, the electro-optic window assembly 100 is configured to minimize the temperature gradient developed between the visible area 144 and the shade area 146. In one aspect, the assembly 100 can be configured such that the temperature gradient between the visible area 144 on the one hand, and the peripheral edges 116a, 118a and the peripheral portions 116b, 118b of the substrates 116, 118 on the other, is minimized. Minimizing thermal gradients within the substrates 116, 118 can reduce the thermal stress levels within the substrates 116, 118, particularly at the edges 116a, 118a. In some aspects of these embodiments, a distance 160 between the bezel lower edge 104a and the peripheral edges 116a, 118a of the substrates 116, 118 (as located within the shade area 146) can be increased to reduce radiation-induced thermal gradients within the assembly 100. It is also possible to increase the thermal conductivity of the conduction path between the substrates 116, 118 and the bezel 104 to reduce these radiation-induced thermal gradients between the visible area 144 and the shade area 146. Furthermore, the peripheral portions 116b, 118b of the substrates 116, 118 can be heated by an element to decrease any temperature gradient between the visible area 144 and the shade area 146 that might otherwise develop from radiation exposure to the visible area 144. Combinations of the foregoing approaches, and/or modifications consistent with their elements, can also advantageously reduce these thermal gradients within the substrates 116, 118.

With respect to decreasing the temperature gradient by increasing the distance 160 between the visible area 144 and the peripheral edges 116a, 118a of the substrates 116, 118, the outer dimension of the electro-optic element 102 can be increased, the visible area 144 can be decreased, or a combination thereof. For example, the bezel lower edge 104a can be extended inward to effectively increase the shade area 146 and decrease the visible area 144 of the assembly 100. As shown by FIG. 1, this modification will increase the distance 160 and can reduce the thermal gradients associated with radiation exposure to the visible area 144. Likewise, it is also possible to extend the length of substrates 116, 118 such that the peripheral portions 116a, 118a covered by the bezel 104 are increased in length. As the peripheral portions 116a, 118a are extended within the bezel 104, the distance 160 increases in magnitude, while the visible area 144 remains unchanged. Other approaches to changing the distance 160 are also feasible. In general, the radiation-induced gradient within the electro-optic assembly 100 and electro-optic element 102 can be reduced when the visible area 144 is decreased in size and/or the shade area 146 is increased in size.

As outlined earlier, the thermal conduction path between the edge of the visible area 144 for substrates 116, 118 and the peripheral edges 116a, 118a can be improved to reduce these radiation-induced thermal gradients in the electro-optic window assembly 100 and the electro-optic element 102. For example, a high thermal conductivity layer 102a can be placed across and/or around the peripheral portions 116b, 118b of the substrates 116, 118 (e.g., between the bezel 104 and the peripheral portions 116b, 118b) to improve heat transfer between the visible area 144 of the substrates 116, 118 and across and/or around the peripheral portions 116b, 118b. The high, thermal conductivity layer 102a can be applied or otherwise placed on the first and fourth surfaces 120a and 126a in the peripheral portions 116b, 118b of the substrates 116, 118 (see FIGS. 1 and 3). The layer 102a, in some aspects, can be a high conductivity ring (or ring sections), bonded to the first and fourth surfaces 120a and 126a, respectively, of substrates 116, 118 with sufficient thickness as understood by those in the field to reduce the temperature gradient. In additional aspects of the window assembly 100, as outlined earlier, layer 102a may also comprise a heating element that is configured to raise the temperature of peripheral portions 116b, 118b of the substrates 116, 118 when visible area 144 is exposed to radiation. Layer 102a, when configured as a heating element, may comprise an electrically conductive material capable of being resistance-heated. Further, layer 102a, when comprising a heating element, can be coupled to conventional sensor(s), power source(s) and/or a controller to perform its intended function as understood by those with ordinary skill in the field.

In an additional aspect of these embodiments, a substantially continuous ring around the perimeter of the electro-optic element 102 may be applied to reduce the hoop stresses experienced by the peripheral edges 116a, 118a of the substrates 116, 118 caused by thermal gradients in the electro-optic window assembly 100 induced by radiation exposure to the visible area 144 (see FIG. 1). In this aspect, the bezel 104 is modified such that a portion of it is placed in direct mechanical contact with the peripheral edges 116a, 118a to generate a compressive force against the substrates 116, 118 in the direction from the shade area 146 to the visible area 144 and/or in the transverse hoop direction. More specifically, the portion of bezel 104 modified in this fashion can be a separate, continuous ring-like feature or it may be integral with the bezel 104.

According to a further aspect of this disclosure, the electro-optic window assembly 100 depicted in FIG. 1 can be configured such that the substrates 116, 118 have increased hoop strength at their peripheral edges 116a, 118a. By increasing the hoop strength of the substrates 116, 118, the likelihood of failure associated with thermal stress from radiation exposure to the visible area 144 will decrease. Various approaches can be utilized in the electro-optic window assembly 100 to increase the hoop strength of the peripheral edges 116a, 118a. For example, edge treatments (e.g., treatments including but not limited to seaming, grinding, coatings and laser cutting) can be applied to the peripheral edges 116a, 118a of the substrates 116, 118. In an additional approach, various substrate compositions can be selected for the substrates 116, 118 that have improved mechanical properties and/or thermal properties to increase the resistance of the substrates 116, 118 to thermal stress and/or reduce the thermal, hoop stress levels associated with radiation-induced temperature gradients in the window assembly 100.

In these aspects of the electro-optic window assembly 100, the improved mechanical properties associated with the substrates 116, 118 can be manifested in glass compositions with higher Weibull modulus values, higher characteristic strength, higher average failure strength levels and/or other mechanical properties indicative of increased resistance of the substrates 116, 118, particularly the peripheral edges 116a, 118a, to thermal stress-related failures and crack propagation. With regard to improving the thermal properties of the substrates 116, 118, a substrate material with a lower coefficient of thermal expansion ("CTE") can be employed. For purposes of explanation and not limitation, a substrate having a CTE value that is at least a factor of approximately two lower than soda-lime float ("SLF") glass can be used. For example, substrates 116, 118 can be fabricated with a boroaluminosilicate ("BAS") glass composition (e.g., Corning Incorporated EAGLE™ glass), a glass composition that possesses a CTE substantially lower than the CTE of an SLF glass. Published CTE values for SLF and BAS glass compositions are $75 \times 10^{-7}$ and $32 \times 10^{-7}$ °C.$^{-1}$, respectively. By decreasing the CTE of the substrates 116, 118, the hoop stresses associated with radiation-induced exposure in the visible area 144 can be significantly decreased for the same temperature gradient in the substrates 116, 118 (e.g., the temperature gradient that exists from the visible area 144 to the shade area 146, or to the peripheral edges 116a, 118a of the substrates 116, 118). This is because the thermal hoop stress generated in the substrates 116, 118 is proportional to the CTE of the glass composition employed in the substrates.

With respect to electro-optic window assembly design, static fatigue of the glass substrates employed in the assemblies can occur when the glass is stressed under a static tensile load condition. When the static tensile stresses are in excess of the static fatigue limit of the glass, subcritical crack growth can originate at a flaw. Depending upon the applied stress (over the static fatigue limit) and the environmental conditions, the glass experiences static fatigue and will eventually fail during a time period that can range anywhere from microseconds to years. The published static fatigue limit for SLF rods is around 27.6 MPa (4,000 psi). A differential temperature of approximately 50° C. between a visible area and non-visible area in the glass substrates employed in window assemblies might exist under end-use application conditions (e.g., from radiation exposure to the visible area) and is estimated to result in a theoretical maximum hoop stress (thermal-induced) near this limit of 27.6 MPa. Further, data taken from window assemblies in an application environment have indicated temperature gradient values approaching a 50° C. differential temperature.

In view of the foregoing, the electro-optic window assembly 100 depicted in FIG. 1 can advantageously be configured such that its substrates 116, 118 experience a theoretical maximum thermal stress of less than approximately 25 MPa when a temperature gradient of approximately 50° C. exists between the visible area 144 and the shade area 146 of the assembly 100. As used herein, "thermal stress," "thermal hoop stress" or the like relate to stress levels that develop in the substrates 116, 118 from temperature gradients in the substrates, but do not include stresses developed in the substrates 116, 118 from other sources (e.g., structural loading conditions). In some configurations, the visible area 144 and the peripheral portions of 116b, 118b of the substrates 116, 118 can be sized to ensure that these thermal stress levels are less than approximately 25 MPa. Similarly, the assembly 100 can be configured such that the substrates 116, 118 each possess a thermal stress level of less than approximately 25 MPa based on a 50° C. thermal gradient between the peripheral portions 116b, 118b of the substrates 116, 118 and the visible area 144.

In some additional aspects, the window assembly 100 can be configured such that the substrates 116, 118 each possess thermal stress levels less than approximately 20 MPa, less than approximately 15 MPa, and/or less than or equal to approximately 12 MPa when thermal gradients of approximately 50° C. exist between the visible area 144 and the shade area 146. Window assembly 100 can also be configured to exhibit these thermal stress levels upon exposure to radiation-induced thermal gradients below a 50° C. differential or above it (e.g., a 100° C. differential). For example, the window assembly 100 can be configured such that the substrates 116, 118 each exhibit thermal stress levels of approximately 25 MPa when an approximately 75° C., 100° C., or 150° C. thermal gradient exists between the peripheral portions 116b, 118b of the substrates 116, 118 and the visible area 144.

It should also be understood that the theoretical maximum thermal hoop stress experienced in the substrates 116, 118 is primarily a function of the thermal gradients between the visible area 144 and the shade area 146 and, more specifically, the gradients between the visible area 144 and the peripheral edges 116a, 118a. Nevertheless, the shape of the substrates 116, 118 can be a factor to predict actual expected values for thermal-induced hoop stress in the substrates 116, 118 produced by these temperature gradients. As such, the shape of the substrates 116, 118 can be chosen to minimize stress concentration factors, particularly in the peripheral edges 116a, 118a of the substrates.

As outlined earlier, edge treatments can be utilized to enhance the mechanical properties of the substrates 116, 118 employed in the electro-optic window 100. In particular, these edge treatments can be used to increase the hoop strength of the peripheral edges 116a, 118a and the peripheral portions 116b, 118b of the substrates 116, 118. Suitable edge treatments include grinding the substrates 116, 118 to a desired size to provide more consistent edge strength levels at the peripheral edges 116a, 118a as compared to mechanical scribe cutting and then seaming the corners of the edges 116a, 118a.

Likewise, a laser cutting operation is also suitable to generate the peripheral edges 116a, 118a of the substrates 116, 118. An exemplary laser cutting process is described in U.S. Provisional Patent Application Nos. 61/678,137 and 61/713,929, and U.S. Non-Provisional patent application Ser. No. 13/956,957, all of which are incorporated by reference herein. It is believed that grinding and/or laser cutting operations conducted to the peripheral edges 116a, 118a have the effect of substantially removing defects at the surface of the substrates 116, 118, the presence of which can reduce the strength at which a failure may occur and/or increase the mechanical strength variability of a given glass composition employed for the substrates 116, 118. According to at least one embodiment, a laser system can be used to form one or more laser induced channels in substrates 116, 118. A plurality of laser-induced channels can be formed in the substantially clear substrates, such that the substrates 116, 118 can be severed into multiple pieces in a desired shape. Additionally, once separated into small pieces, laser-induced channels, which now are the peripheral edges 116a, 118a, have enhanced edge characteristics, such as, but not limited to, enhanced edge strength and reduced roughness as compared with edges that are formed by other conventional cutting or separating systems/methods, material changes, etc. Thus, one advantage is that the laser-induced channel edges do not require further processing to smooth the peripheral edges 116a, 118a and/or increase the edge strength. Typically, these laser-induced channel edges do not contain substantial amounts of particulates that can be dislodged during subsequent processing.

As illustrated in FIG. 2, the electro-optic window assembly 100a can include a pressure pane frame 148 and a pressure pane 150. Further, unless otherwise expressly noted, the window assembly 100a contains the same elements as employed in the window assembly 100 depicted in FIG. 1. Here, the electro-optic window assembly 100a may be mounted in a structure 152, such as, but not limited to, a building, a motorized vehicle (e.g., an airplane, an automobile, etc.), or the like. In general, the foregoing principles and embodiments described in connection with electro-optic window assembly 100 (see FIG. 1) apply equally to the window assembly 100a depicted in FIG. 2. Notably, the radiation-induced gradients that exist between the visible area 144 and the shade area 146 in assembly 100 (see FIG. 1) are equally applicable to the window assembly 100a.

Referring to FIG. 3, an electro-optic window assembly 100b is depicted with a similar configuration as the assembly 100a depicted in FIG. 2. Unless otherwise expressly noted, the window assembly 100b contains the same elements as employed in the window assembly 100 depicted in FIG. 1. Further, the foregoing principles and embodiments described in connection with electro-optic window assembly 100 and 100a (see FIGS. 1 and 2) apply equally to the window assembly 100b depicted in FIG. 3. As depicted in FIG. 3, the window assembly 100b is configured to enhance thermal conduction and heat transfer between the visible area 144 of the electro-optic element 102 (and its substrates 116, 118) and the peripheral edges 116a, 118a of the substrates 116, 118. For example, the window assembly 100b depicted in FIG. 3 can incorporate a high, thermal conductivity layer 102a that is applied or otherwise placed on the first and fourth surfaces 120a and 126a of the substrates 116, 118. As the first and fourth surfaces 120a and 126a are part of the substrates 116 and 118, the inclusion of the high thermal conductivity layer 102a enhances thermal conduction from the visible area 144 of the substrates 116, 118 to the peripheral edges 116a, 118a. In some aspects of the window assembly 100b, the layer 102a can be a high, thermal conductivity ring (or ring sections), bonded to the first and fourth surfaces 120a and 126a, respectively, of substrates 116, 118 with sufficient thickness to reduce the temperature gradients in the substrates 116, 118 associated with radiation exposure to the visible area 144 of the assembly 100b. In additional aspects of the window assembly 100b, the layer 102a can comprise a heating element, as detailed earlier in this disclosure.

Figure 4:
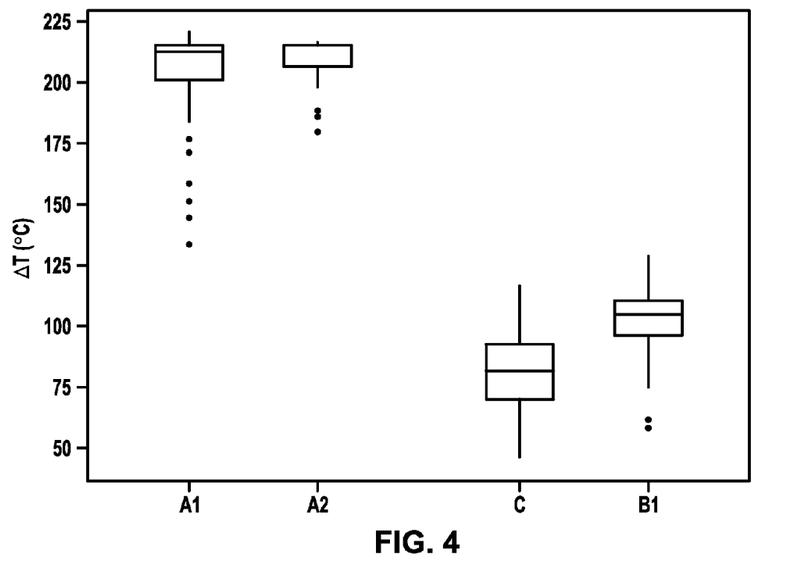
FIG. 4 is a box plot of failure temperature differentials (° C.) for glass substrates with seamed and ground peripheral edges, and boroaluminosilicate and soda lime float glass compositions, tested with a thermal hoop stress apparatus according to an embodiment of the disclosure.

Referring to FIG. 4, a box plot depicts failure temperature differential (° C.) data for glass substrates with mechanically seamed or ground peripheral edges according to an additional embodiment. Further, some of the substrates tested in FIG. 4 possessed a BAS composition, and the remainder possessed an SLF composition. Thermal stress testing was performed using a thermal hoop stress testing apparatus capable of generating a thermal gradient between the peripheral edges of the glass substrate sample (e.g., peripheral edges 116a, 118a) and its central area (e.g., visible area 144). Notably, the thermal testing apparatus was used to test samples with substantially elliptical shape factors consistent with window assemblies employed in some airplane applications. In FIG. 4, the "A1" and "A2" groups possessed a BAS composition, and the "B1" and "C" groups possessed a SLF composition. In addition, the "A1" and "C" groups were indicative of glass substrates with mechanically seamed peripheral edges (e.g., peripheral edges 116a, 118a). In contrast, the "A2" and the "B1" groups were indicative of glass substrates with peripheral edges ground to their final dimensions.

Each tested substrate within the "A1," "A2," "B1," and "C" groups (N=139 for the "A1" group, N=29 for the "A2" group, N=78 for the "B1" group, and N=60 for the "C" group) depicted in FIG. 4 was successively subjected to larger and larger temperature gradients by the thermal stress tester until substrate failure. The temperature differential associated with each failure was then recorded within each test group. As FIG. 4 makes clear, the "A1" and "A2" groups possessed higher average, failure temperature differentials, along with significantly less variability in the reported failure temperature differential values compared to the "B1" and "C" groups. Hence, the choice of BAS for the substrate composition significantly improves the performance of the substrates when subjected to thermal stresses associated with temperature gradients. In addition, the "A2" and the "B1" groups of substrates with ground peripheral edges demonstrated higher average failure temperature differentials and less variability compared to their respective "A1" and "C" group counterparts having mechanically seamed edges. As such, the use of a grinding process for the peripheral edges of the substrates can significantly improve the failure performance of the substrates upon exposure to thermal stresses from temperature gradients. In sum, the results in FIG. 4 demonstrate that grinding of the peripheral edges 116a, 118a and/or selection of BAS compositions for the substrates 116, 118 can be employed in some embodiments of the window assemblies 100, 100a and/or 100b.

Figure 5:
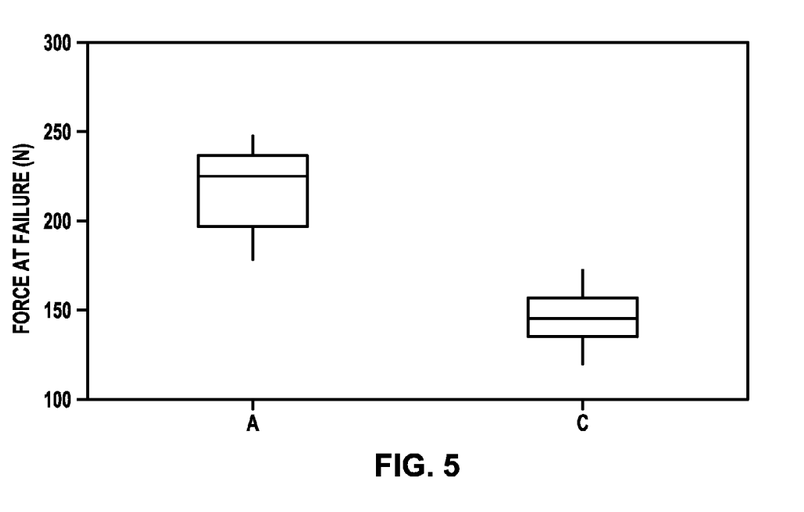
FIG. 5 is a box plot of failure loads (N) for glass substrates with scribed and laser cut peripheral edges tested with a four-point flexure testing apparatus based on American Society for Testing and Materials ("ASTM") Test Specification No. C158-02 according to a further embodiment of the disclosure.

In FIG. 5, a box plot of failure loads (N) for glass substrates with mechanically scribe cut or laser cut peripheral edges (e.g., peripheral edges 116a, 118a) tested with a four-point flexure testing apparatus based on American Society for Testing and Materials ("ASTM") Test Specification No. C158-02 is presented according to a further embodiment of the disclosure. In particular, the "A" group corresponds to failure data associated with test substrates having an SLF composition with peripheral edges that are laser cut. The "C" group, on the other hand, corresponds to failure data associated with test substrates having an SLF composition with peripheral edges that are mechanically scribe cut. In particular, the samples for each group were subjected to bending along their longest dimension, and were compressed at a rate of approximately 5 mm/min until failure.

As illustrated in FIG. 5, the maximum force before failure for the "C" group (scribe cut) samples is about 172 N, whereas the "A" group (laser cut) samples typically failed between 175 N and 248 N. As such, a window assembly 100, 100a, and/or 100b (see FIGS. 1-3) employing substrates 116, 118 with peripheral edges 116a, 118a that are formed via a laser cutting operation can have a failure force of greater than approximately 175 N, greater than approximately 185 N, ranging from and including approximately 175 N to 300 N, ranging from and including approximately 175 N to 250 N, ranging from and including approximately 185 N to approximately 235 N, or a combination thereof.

As evidenced by the data presented in FIG. 5, a substrate (e.g., substrates 116, 118) having at least one laser-induced channel edge (e.g., laser cut peripheral edges 116a, 118a) can have a more consistent failure strength when evaluating a plurality of samples, particularly as compared to substrates having other types of peripheral edges (e.g., a scribe cut edge). Thus, when substrates having laser-induced channel edges are subjected to a mechanical test (e.g., 4-point flexure testing under ASTM C158-02) to determine edge stress failure strength (in a bending mode), the laser-induced channel substrates typically fail around the same value (e.g., ranging from and including approximately 32 MPa to 42 MPa). In one set of such tests, the slope of the line representative of the failure strength data relating to substrates having a laser-induced channel edge is about 18.2, indicative of the Weibull modulus of these samples. According to at least one embodiment, window assemblies 100, 100a and/or 100b with substrates 116, 118 having at least one laser-induced channel edge (at the peripheral edges 116a, 118a) can have a stress failure probability slope of greater than approximately 8.5, greater than approximately 10, greater than approximately 15, approximately 18.21, or a combination thereof.

Advantageously, the electro-optic window assemblies 100, 100a and 100b each can possess substrates 116, 118 with a reduced thermal hoop stress at the peripheral edges 116a, 118a associated with radiation-induced thermal gradients, while at the same time having the same outer dimensions (e.g., overall length of electro-optic element 102) and the same visible area 144 as other non-optimized electro-optic window assemblies. Put another way, assemblies 100, 100a, and 100b can be configured to reduce thermal stress levels in the substrates 116, 118 and/or increase the resistance of these substrates to thermal stress without having to compromise the sizing and overall dimensions of the assemblies, factors driven by other marketing and engineering considerations. For example, assemblies 100, 100*a*, and 100*b* can be configured to resist radiation-induced thermal gradients (e.g., via improved thermal conduction between the peripheral edges 116*a*, 118*a* of the substrates and the visible area 144, and/or enhanced thermal and mechanical properties of the substrates 116, 118, etc.) such that the dimensions of the visible area 144 do not need to be reduced and the length of the electro-optic element 102 does not need to be increased. In this way, electro-optic assemblies 100, 100*a* and 100*b* can be configured to maximize resistance to radiation-induced thermal gradients without compromising performance in view of other engineering considerations of the application (e.g., maximizing visible area 144 for customer needs, minimizing the length of the electro-optic element 102 in view of the weight considerations of the window assembly 100, etc.). It should be appreciated by those skilled in the art that the electro-optic window assemblies 100, 100*a*, and 100*b* can have additional or alternative advantages. It should further be appreciated by those skilled in the art that the above-described components can be combined in additional or alternative ways not explicitly described herein.

Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

What is claimed is:

1. An electro-optic window assembly, comprising:
a first substantially transparent substrate comprising:
a first surface,
a second surface, and
a first peripheral edge;
a second substantially transparent substrate comprising:
a third surface,
a fourth surface, and
a second peripheral edge,
wherein the first and second substrates define a cavity; and
an electro-optic medium at least partially filling the cavity and configured to reduce the transmission of light viewed through the electro-optic window assembly,
wherein the electro-optic window assembly is configured such that the substrates each have a theoretical maximum thermal stress of less than approximately 25 MPa upon exposure of the window assembly to an approximately 50° C. thermal gradient.

2. The electro-optic window assembly of claim 1, wherein the substrates each have a theoretical maximum thermal stress of less than approximately 20 MPa.

3. The electro-optic window assembly of claim 1, wherein the substrates each have a theoretical maximum thermal stress of less than approximately 15 MPa.

4. The electro-optic window assembly of claim 1, wherein the substrates each have a theoretical maximum thermal stress of less than or equal to approximately 12 MPa.

5. The electro-optic window assembly of claim 1, wherein the substrates consist essentially of a composition with a coefficient of thermal expansion of approximately $37 \times 10^{-7} \, °C.^{-1}$ or less.

6. The electro-optic window assembly of claim 5, wherein the peripheral edges of the substrates are substantially defect free, indicative of a grinding operation.

7. An electro-optic window assembly, comprising:
a bezel having an inner edge, the bezel covering a peripheral portion of a first substantially transparent substrate and a peripheral portion of a second substantially transparent substrate;
a first substantially transparent substrate comprising:
a first surface with a portion in thermal communication with the bezel,
a second surface, and
a first peripheral edge;
a second substantially transparent substrate comprising:
a third surface,
a fourth surface with a portion in thermal communication with the bezel, and a
second peripheral edge,
wherein the first and second substrates define a cavity, and the fourth surface and the inner edge of the bezel define a visible area; and
an electro-optic medium at least partially filling the cavity and configured to reduce the transmission of light viewed through the electro-optic window assembly,
wherein the visible area and the peripheral portions are sized such that the substrates each have a theoretical maximum thermal stress of less than approximately 25 MPa upon exposure of the electro-optic window assembly to an approximately 50° C. thermal gradient.

8. The electro-optic window assembly of claim 7, wherein the substrates each have a theoretical maximum thermal stress of less than approximately 20 MPa.

9. The electro-optic window assembly of claim 7, wherein the substrates each have a theoretical maximum thermal stress of less than approximately 15 MPa.

10. The electro-optic window assembly of claim 7, wherein the substrates each have a theoretical maximum thermal stress of less than or equal to approximately 12 MPa.

11. The electro-optic window assembly of claim 7, further comprising:
a high thermal conductivity layer between the bezel and the peripheral portions of the substrates.

12. The electro-optic window assembly of claim 7, wherein the substrates consist essentially of a composition with a coefficient of thermal expansion of approximately $37 \times 10^{-7} \, °C.^{-1}$ or less.

13. The electro-optic window assembly of claim 12, wherein the peripheral edges of the substrates are substantially defect free, indicative of a grinding operation.

14. An electro-optic window assembly, comprising:
an exterior structure;
a bezel in thermal communication with the exterior structure, the bezel having an inner edge, and covering a peripheral portion of a first substantially transparent substrate and a peripheral portion of a second substantially transparent substrate;
a first substantially transparent substrate comprising:
a first surface with a portion in thermal communication with the bezel,
a second surface, and
a first peripheral edge;
a second substantially transparent substrate comprising:
a third surface,
a fourth surface with a portion in thermal communication with the bezel, and a
second peripheral edge,
wherein the first and second substrates define a cavity, and the fourth surface and the inner edge of the bezel define a visible area; and an electro-optic medium at least partially filling the cavity and configured to reduce the transmission of light viewed through the electro-optic window assembly, wherein the electro-optic window assembly is configured such that the substrates each have a theoretical maximum thermal stress of less than approximately 25 MPa when an approximately 50° C. thermal gradient exists between the peripheral portions of the substrates and the visible area.

15. The electro-optic window assembly of claim 14, wherein the substrates each have a theoretical maximum thermal stress of less than approximately 25 MPa when an approximately 75° C. thermal gradient exists between the peripheral portions of the substrates and the visible area.

16. The electro-optic window assembly of claim 14, wherein the substrates each have a theoretical maximum thermal stress of less than approximately 25 MPa when an approximately 100° C. thermal gradient exists between the peripheral portions of the substrates and the visible area.

17. The electro-optic window assembly of claim 14, wherein the substrates each have a theoretical maximum thermal stress of less than or equal to approximately 25 MPa when an approximately 150° C. thermal gradient exists between the peripheral portions of the substrates and the visible area.

18. The electro-optic window assembly of claim 14, further comprising:

a high thermal conductivity layer between the bezel and the peripheral portions of the substrates.

19. The electro-optic window assembly of claim 14, wherein the substrates consist essentially of a composition with a coefficient of thermal expansion of approximately $37 \times 10^{-7}$ °C.$^{-1}$ or less.

20. The electro-optic window assembly of claim 19, wherein the peripheral edges of the substrates are substantially defect free, indicative of a grinding operation.

* * * * *